March 4, 1952 — H. H. MILLER — 2,588,145
ELECTRIC COOKING APPLIANCE
Filed Feb. 11, 1950 — 2 SHEETS—SHEET 1
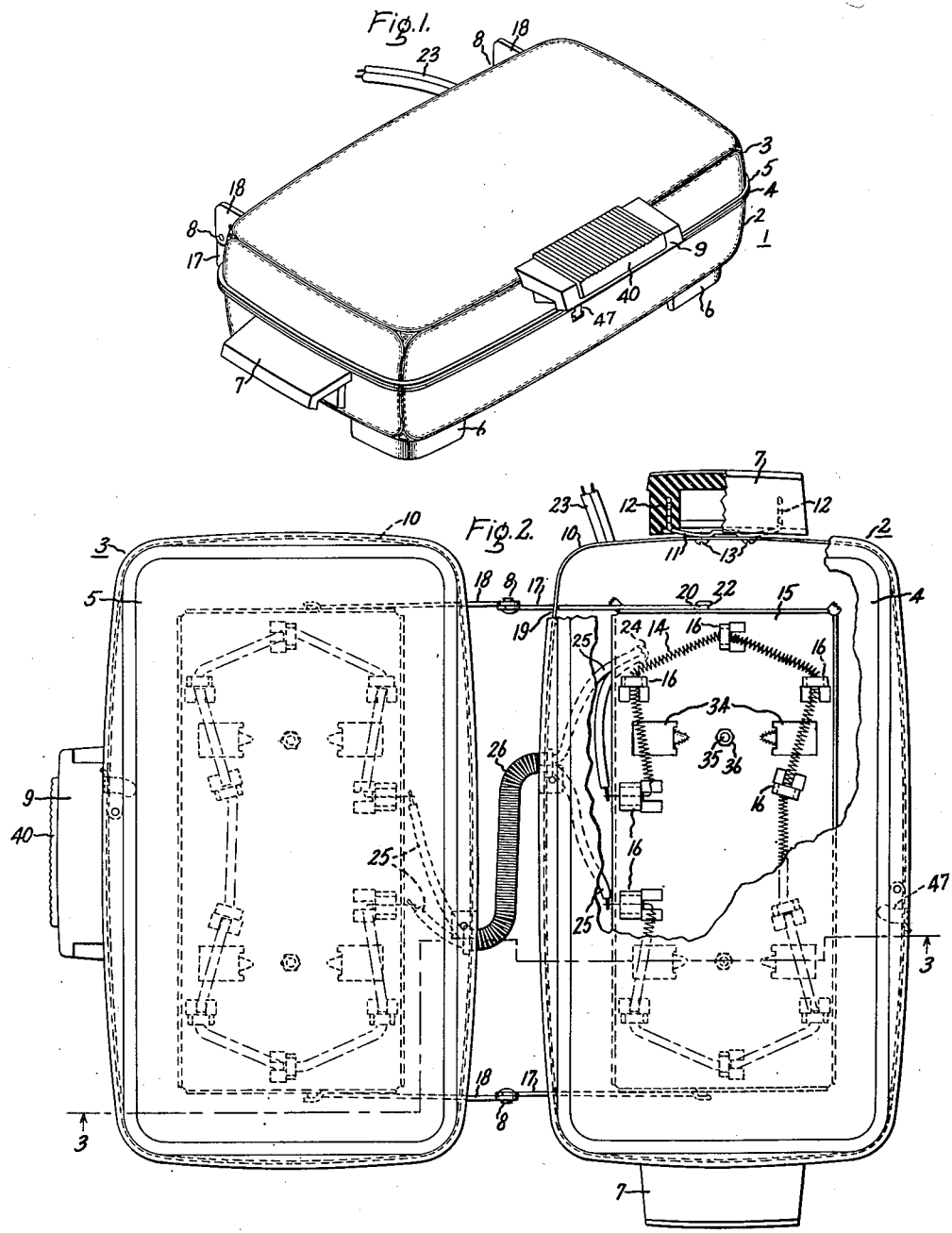
Inventor:
Homer H. Miller,
by (signature)
His Attorney.

March 4, 1952      H. H. MILLER      2,588,145
ELECTRIC COOKING APPLIANCE
Filed Feb. 11, 1950      2 SHEETS—SHEET 2
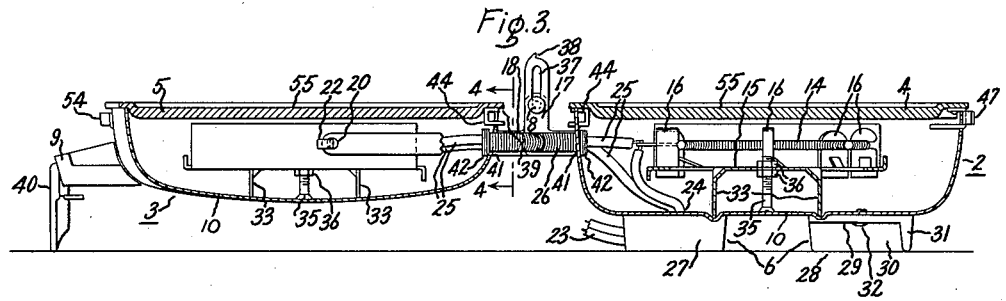
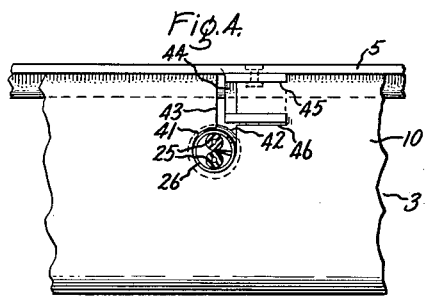
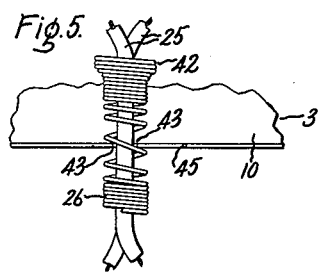
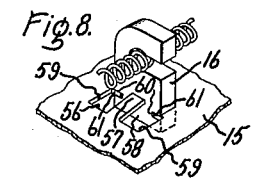
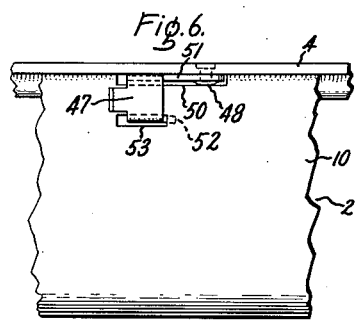
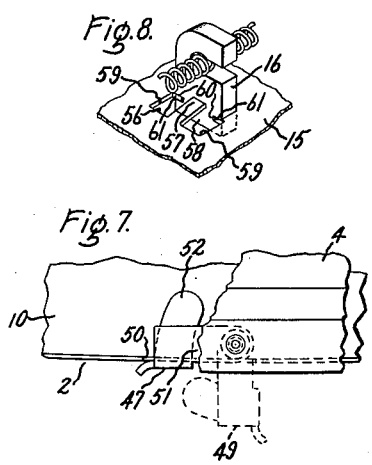
Inventor:
Homer H. Miller,
by /s/ Sheridan...
His Attorney.

Patented Mar. 4, 1952

2,588,145

UNITED STATES PATENT OFFICE 2,588,145

ELECTRIC COOKING APPLIANCE

Homer H. Miller, Bridgeport, Conn., assignor to General Electric Company, a corporation of New York Application February 11, 1950, Serial No. 143,728

5 Claims. (Cl. 99—376)

1

This invention relates to electric cooking appliances and, more particularly, to such appliances having removable and interchangeable cooking grids for adapting the appliance for different cooking operations such as toasting sandwiches or cooking waffles.

Since the market for such devices is highly competitive and the quantity produced is very large, any simplification of design which results in greater economy of manufacture, without detracting from the beauty or utility of the device, is very important and useful.

Accordingly, it is an object of this invention to provide a device of the above description which is characterized by greater economy and simplicity of manufacture.

It is a further object of this invention to provide an electric cooking appliance having cooking grids which may be easily and quickly removed for cleaning or replacement and involving simple grid attachment structure which is economical to manufacture.

It is a further object of this invention to provide an electric cooking appliance having upper and lower heat-producing portions for respectively applying heat to the upper and lower surfaces of the food which is in preparation, the upper elements being hingedly mounted to the lower elements and having improved flexible electrical connections between said upper and lower elements.

This invention, therefore, consists generally in an electric cooking appliance having hingedly connected upper and lower portions and removable cooking grids in each of the portions which are normally retained in assembled relationship by means of notches within the enclosing shells of the sections, one of the notches in each section serving the additional function of an entrance opening for electrical conductors, and improved flexible connections between the openings.

For a more complete understanding of this invention, reference should be had to the following specification and the accompanying drawings in which Fig. 1 is a perspective view of the cooking appliance of this invention in the closed position; Fig. 2 is a top view of the appliance in the fully opened position with the lower grid partially cut away to show the arrangement of electric heater elements; Fig. 3 is a sectional view of the appliance through the section 3—3 of Fig. 2; Fig. 4 is a partial sectional view on the line 4—4 of Fig. 3 showing the interconnection conductors between the upper and lower portions of the appliance and the housing therefor, as well as the entrance opening for the conductors into the upper portion and the method of connection of a grid-retaining bracket to this section. Fig. 5 is a top view showing the method of inserting the interconnection conductors and housing into the opening in the upper shell shown in Fig. 4; Fig. 6 is a partial view of the front of the shell of the lower section of the appliance showing the connection of a pivoted grid-retaining bracket; and Fig. 7 is a top view of the structure of Fig. 6 with an additional portion of the grid cut away to show the method of operation of the pivoted grid-retaining bracket. Fig. 8 is a detailed view of one of the electrical heater element supports showing the method of attachment to a support plate.

Referring more particularly to the drawing, in Fig. 1 there is shown a perspective view of an electric cooking appliance I including a lower portion 2 and an upper portion 3 having cooking grids 4 and 5, respectively, associated therewith. Supporting feet 6 of suitable insulating material are provided for the support of the appliance, and two handles 7, only one of which is visible, are associated with the lower portion for lifting and moving the appliance. The upper section 3 is mounted upon the lower section 2 by means of hinges 8 which allow the upper section to be raised pivotally by means of a handle 9 of heat insulating material. The structure of handle 9 forms the subject of my currently filed co-pending patent application, Serial No. 143,729, which application is owned by the General Electric Company, assignee of the instant application.

In Fig. 2, the cooking appliance is shown in the fully opened position, as viewed from the top, with a portion of grid 4 cut away to reveal the detailed construction and assembly of the heater elements and the conductors associated therewith. One of the handles 7 is also shown partially in section to reveal that these handles are mounted to the outer shell 10 of the lower section 2 by means of mounting brackets 11. These brackets are held in assembled relationship with the handles 7 by means of barbed tongues 12 which are inserted into suitable slots within the handle bodies. The brackets are fastened to the shell 10 by means of suitable screw threaded fastenings 13. The upper and lower portions each include outer shells 10, within which electrical heater elements 14 are mounted on suitable support plates 15 by means of heater element supports 16. Hinge brackets 17 and 18, for portions 2 and 3, respectively, pass through suitable openings at 19 in the shells 10 and are fastened at their terminal ends 20 to the support plates 15 by means of small metal tongues 22, which protrude from the outer edges of the plates, through suitable holes provided at ends 20. The tongues 22 are bent around the ends 20 to hold them securely.

Conductors 23 are provided for conveying electrical power to the appliance and these conductors enter the shell 10 of lower section 2 through one of the supporting feet 6 and an opening at 24. Power is conveyed through interconnection conductors 25 between the shells of sections 2 and 3 through suitable openings in the respective shells and a guard 26 which consists of a helical coil of suitable abrasion-resisting material such as steel.

Further details of the structure of this appliance are shown in Fig. 3 which is a sectional view on the line 3—3 on Fig. 2. The structure of the foot on the left at 27, through which the conductors 23 enter the appliance, forms the subject matter of my concurrently filed copending patent application, Serial No. 143,727 filed February 11, 1950, which issued as Patent No. 2,544,343 on March 6, 1951, which application is owned by the General Electric Company, assignee of the instant application. The other three supporting feet are of the structure shown at 28 having base portion 29 of relatively uniform thickness and two downwardly-extending flange portions 30 and 31 which join at a radiused bend and are respectively aligned at an angle slightly greater than 90°. These feet are held in assembled relationship on the appliance by means of riveted fastening 32.

The plates 15 are supported and positioned by downwardly-extending legs 33 which are punched out of the plate material, leaving the openings at 34 in Fig. 2. Screw studs 35, which are welded at their heads to the interior of shell 10, firmly retain the plates 15 in assembled position by means of nuts 36.

The hinge brackets 17 on the lower section 2, as shown in Fig. 3, each have a slot 37 to accommodate the pivotal connection 8. A notch is provided at the top of each bracket 17 at 38 to engage the edge of grid 5 at 39 to retain the upper section 3 in a position at an angle of approximately 90° with respect to the lower section 2 upon initial opening of the cooking appliance. If further rotation of the upper section 3 to the position shown in Fig. 3 is desired, the section must be raised, making use of the slotted connection of pivot 8 in slots 37, to disengage the edge 39 of grid 5 from the notch 38. The slots 37 also allow upper section 3 to rise freely when the appliance is closed as in Fig. 1 if there is a pressure generated by the food which is cooking between the grids 4 and 5.

In the open position shown in Fig. 3, the upper section 3 is supported at the outer edge by a support portion 40 of handle 9 As mentioned above, the structure of this handle forms the subject matter of a separate patent application. The guard 26 for interconnection conductors 25 is retained in position within openings 41 in shells 10 by means of terminal portions 42 which are of slightly larger diameter than the body of the guard. The shape of openings 41 and the structure of the attachments are better shown in Fig. 4, which shows the guard 26 and the interconnection conductors 25 through section 4—4 of Fig. 3 and a portion of the shell 10 of upper portion 3 together with a segment of the grid 5. The conductor opening 41 includes a narrow slot portion at 43 through which the conductors 25 and guards 26 may be assembled by spreading the individual loops of the wire. This is illustrated in Fig. 5, which is a top view of the portion of shell 10 shown in Fig. 4 with grid 5 removed, where the wires and guard are shown partially assembled. A grid-retaining bracket 44 fits into auxiliary portions 45 and 46 of slot 43 as also shown in Fig. 3. Thus, the same edge opening, including the slot 43, the auxiliary slots 45 and 46, and the conductor opening 41, serves as a fastening point for both the grid and the interconnection conductors. When in the assembled position, bracket 44 partially obstructs and closes the narrow portion of slot 43 which opens to the edge of the shell, thus to retain guard 26 from disassembly. The connections of these elements to the shell of the lower section 2, including the grids 4 instead of the grids 5, are accomplished in substantially the same manner, the same shape of opening being provided.

In Fig. 6, there is shown a partial front view of the shell 10 of section 2 showing the structure of the attachment of grid 4 to the shell. This structure includes a pivoted grid-retaining bracket 47 which pivots about a mounting rivet 48. This pivoting action is clearly shown in the partial top view of Fig. 7 where the bracket 47 is shown in phantom in the disengaged position at 49. In Fig. 6, shell 10 is shown to have a notched-out portion at 50 to accommodate the upper body portion 51 of bracket 47. A tongue portion 52 of bracket 47 extends through a slot 53 in shell 10 in the assembled position to retain the grid 4 against upward separating movement away from shell 10. The attachment of the front of upper grid 5 is accomplished at 54 in Fig. 3 by a substantially identical structure. The grids 4 and 5 are of substantially identical structure with smooth interior faces or cooking surfaces shown at 55 in Fig. 3. These grids are suitable for use of the appliance as a sandwich grill, or, when in the open position as shown in Figs. 2 and 3, as a flat surface cooker for frying pancakes, bacon and eggs, or the like. The grids may be removed by unlatching pivoted grid-retaining brackets 47, as shown at 49 in Fig. 7, and lifting the front edge of each grid to unlatch the grid-retaining brackets 44 at the back edge. These grids may be thus easily removed for cleaning or replacement. Other grids having the same mounting structure, but with different interior cooking surfaces, may be substituted, for instance, such as waffle iron grids for use of the appliance as a waffle iron.

In connection with the construction it is to be noted that brackets 44 are positioned within the confines of the rims of the grids and for the most part are inside the shells and that the grid retaining brackets 47 are pivoted beneath such rims and pivot in a plane parallel to the plane of the grids so that when in locking position they are located against the outer surface of the shells. Thus there is provided an arrangement wherein the fastening means for the guard and grids are exposed on the outside of the grill to a minimum extent and outwardly projecting parts are kept to a minimum. This adds to the pleasing lines of the grill and at the same time provides fastening means which are simple in structure, low in cost, make insertion and removal of the grids a very simple operation and perform in a satisfactory manner the two functions of fastening both the grids and the coiled guard in place.

In Fig. 8, there is shown a detail view of the structure of one of the heater element supports 16 and the structure of the assembly of these supports on support plate 15. An opening 56 is provided in plate 15 and a tongue member 57 of the material of plate 15 extends into the opening and rests against support 16. To assemble support 16 on plate 15, the tongue 57 is bent upwardly to permit insertion of the lower end 58 of support 16 into the large portion of opening 56 which is defined by the edges 59. Support 16 is then moved back to the position shown into a narrower portion of opening 56, the edges of which are separated only by the dimension between the points indicated at 60. The edges at 60 thereby engage in suitable slots 61 in body member 16; the tongue 57 is bent downwardly to the position shown; and support 16 is then securely held in assembled relationship with plate 15 since the tongue prevents forward movement of the support to disengage edges 60 from slots 61.

It will be seen from the above description that this invention provides for a new and improved electric cooking appliance of the removable grid type which employs an improved and simplified structure which can be produced more economically.

While particular embodiments of the invention have been shown and described, it will be obvious to those skilled in the art that various changes and modifications may be made without departing from the invention in its broader aspects and it is therefore, intended in the appended claims to cover all such changes and modifications as fall within the true spirit and scope of the invention.

What I claim as new and desire to secure by Letters Patent of the United States is:

1. In an electric cooking appliance, an upper portion, a lower portion, said upper portion having a hinge connection with said lower portion for hinging movement with respect thereto, electrical interconnection conductors for conducting electrical power from said lower portion to said upper portion, a helical wire guard having enlarged ends surrounding said interconnection conductors, each of said portions including an outer shell, and a heat-generating element therein, each of said shells including a slot of less width than said guard diameter extending from the edge of said shell to an enlarged circular opening removed from said edge for the reception of said interconnection conductors and said guard, said circular opening being of substantially the same diameter as the intermediate section of said guard, said slot permitting insertion of said assembled conductors and guard into said circular opening with the enlarged guard ends within respective of said shells, removable grids carried by respective of said outer shells, and means on said grids closing said slots.

2. In an electric cooking appliance, an upper portion, a lower portion, said upper portion having a hinge connection with said lower portion for hinging movement with respect thereto, electrical interconnection conductors for conducting electrical power from said lower portion to said upper portion, a helical wire guard having enlarged ends surrounding said interconnection conductors, each of said portions including an outer shell, and a heat-generating element therein, a removable grid associated with each of said shells for transmitting heat from said elements to food to be cooked, a grid-retaining bracket on the edge of said grid, said shell including a slot of less width than the intermediate diameter of said guard and having a first portion extending inwardly from the edge of said shell to an enlarged circular opening of substantially the diameter of said guard intermediate portion positioned inwardly from said edge, said slot also having a second portion substantially parallel to said edge and intersecting said first portion, said conductors and guard being insertable through said slot into said circular opening with the enlarged guard ends within respective of said shells, a retaining tongue on said grid-retaining bracket insertable into said second slot portion for locking said grid to said shell and protruding into said first slot portion to lock said guard in position in said circular opening.

3. In an electric cooking appliance of the type having cooking surfaces hingedly mounted together, a pair of grids forming the cooking surfaces, electric heating means for each of said grids, outer enclosing shells for carrying said grids and enclosing respective of said heating elements, power supply conductors extending between said heating elements exteriorly of said shells, an elongated conductor guard of deformable material enclosing said conductors and having ends of enlarged diameter, each of said shells including an opening of substantially the size and shape of the intermediate section of said guard spaced from the shell edge and a slot of reduced size extending from said opening to the shell edge, deformation of said guard permitting insertion of assembled conductors and guard through said slots into respective of said openings with the enlarged guard ends within respective of said shells, and bracket means on said grids cooperable with said shells for securing each grid to its associated shell and simultaneously closing said slots to withdrawal of said guards.

4. In an electric cooking appliance comprising a pair of hinged shells, cooking grids on the shells, heating units for each grid, electric wires connected to the heating units extending from one shell to the other and a coiled guard for said wires having enlarged ends, means for fastening an end of the coiled guard and a grid to a shell comprising walls defining an opening in the shell spaced from the edge thereof of a size to hold the guard adjacent to its end, a slot of a width less than the width of said opening extending from the opening to the edge of the shell, and an auxiliary slot extending angularly from the first-named slot at a point just above said opening, a bracket at an edge of the grid having an end which hooks into said auxiliary slot, said end being of a width to overlie at least in part said opening whereby it serves to fasten the grid at one point to the shell and hold the guard end in the opening, and means for fastening the grid to the shell at a point remote from said first defined fastening means.

5. In an electric cooking appliance, a shell having an open top, a grid having a rim resting on the peripheral edge of the shell, said shell at one point having an opening, a slot which extends from the opening to the edge of the shell and an auxiliary slot which extends circumferentially from said first-named slot at a point adjacent to the top edge of said opening, a wire guard positioned in said opening, said slot being of a width to permit of the guard being passed through it to the opening, a bracket attached to the underside of the rim of the grid within the confines thereof having an outwardly extending end which hooks into said auxiliary slot, said end being of a width to at least in part overlie said opening whereby it serves to fasten the grid at one point to the shell and hold the guard in the opening, walls defining a locking slot in the shell at a point spaced from said opening, and a lever pivoted beneath the rim of the grid to move in a plane parallel to the plane of the grid having an end to engage in said locking slot.

HOMER H. MILLER.

REFERENCES CITED

The following references are of record in the file of this patent:

UNITED STATES PATENTS

| Number | Name | Date |
|---|---|---|
| 1,405,043 | Kruesheld | Jan. 31, 1922 |
| 2,009,792 | Uhl | July 30, 1935 |
| 2,214,872 | Barnes | Sept. 17, 1940 |
| 2,361,285 | Gough | Oct. 24, 1944 |
| 2,496,705 | Farr et al. | Feb. 7, 1950 |